United States Patent
Kato et al.

(10) Patent No.: US 10,434,777 B2
(45) Date of Patent: Oct. 8, 2019

(54) LIQUID EJECTING HEAD, CLEANING METHOD, AND LIQUID EJECTING APPARATUS

(71) Applicant: CANON KABUSHIKI KAISHA, Tokyo (JP)

(72) Inventors: Maki Kato, Fuchu (JP); Yoshinori Misumi, Tokyo (JP); Takahiro Matsui, Yokohama (JP); Norihiro Yoshinari, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/986,010

(22) Filed: May 22, 2018

(65) Prior Publication Data

US 2018/0345665 A1    Dec. 6, 2018

(30) Foreign Application Priority Data

Jun. 2, 2017    (JP) ................................ 2017-110002

(51) Int. Cl.
     *B41J 2/165*      (2006.01)
     *B41J 2/14*      (2006.01)
     *C09D 11/322*      (2014.01)

(52) U.S. Cl.
     CPC ............ *B41J 2/165* (2013.01); *B41J 2/14072* (2013.01); *B41J 2/14129* (2013.01); *B41J 2/16517* (2013.01); *C09D 11/322* (2013.01); *B41J 2002/16502* (2013.01)

(58) Field of Classification Search
CPC .... B41J 2/165; B41J 2/14072; B41J 2/14129; B41J 2/16517; B41J 2002/16502
See application file for complete search history.

(56) References Cited

U.S. PATENT DOCUMENTS

| | | | |
|---|---|---|---|
| 6,431,685 B1 | 8/2002 | Misumi | |
| 7,344,218 B2 | 3/2008 | Imanaka et al. | |
| 7,841,678 B2 | 11/2010 | Imanaka et al. | |
| 9,114,612 B2 | 8/2015 | Kato et al. | |
| 9,308,722 B2 | 4/2016 | Ishida et al. | |
| 9,682,552 B2 | 6/2017 | Kato et al. | |
| 9,764,550 B2 * | 9/2017 | Ishida | B41J 2/1404 |
| 2018/0141335 A1 | 5/2018 | Goto et al. | |

FOREIGN PATENT DOCUMENTS

JP      2009-051146 A      3/2009

* cited by examiner

*Primary Examiner* — Geoffrey S Mruk
(74) *Attorney, Agent, or Firm* — Venable LLP (57) ABSTRACT

A liquid ejecting head maintains stable ejecting operations without causing kogation. To achieve such operations, the liquid ejecting head includes, in its liquid chamber, a first electrode placed so as to cover a heating resistor, a second electrode placed at a position different from that of the first electrode, and a third electrode. In a case where the heating resistor is driven, a voltage is applied between the first electrode and the second electrode so that the first electrode has the same polarity as that of a predetermined liquid component, and the second electrode has the opposite polarity. In a case where the heating resistor is not driven, a voltage is applied between the second electrode and the third electrode so that the second electrode has the same polarity as that of the predetermined component, and the third electrode has the opposite polarity.

20 Claims, 9 Drawing Sheets

LIQUID EJECTING HEAD, CLEANING METHOD, AND LIQUID EJECTING APPARATUS

BACKGROUND OF THE INVENTION

Field of the Invention

The present invention relates to a liquid ejecting head, a cleaning method for cleaning the liquid ejecting head, and a liquid ejecting apparatus using the liquid ejecting head.

Description of the Related Art

In a liquid ejecting head of a system that involves applying a voltage to a heating resistor to induce film boiling in liquid, resulting in liquid ejection using the growth energy of bubbles, a kogation problem may occur in a case where the liquid ejecting head ejects liquid (ink) containing a coloring material, for example. Kogation refers to a phenomenon in which heat generated by a heating resistor causes a heat-soluble ink component to decompose or denature and then adhere to the surface of the heating resistor. Such kogation degrades the thermal conductivity of the heating resistor and causes the instability of bubbling and ejecting operations.

Japanese Patent Laid-Open No. 2009-51146 discloses a method for preventing kogation of an ink component by placing, in a liquid chamber, an electrode having the same polarity as the surface charge of an ink colloid particle on the upper layer of a heating resistor element and placing an opposite electrode having polarity opposite to that of the former electrode at a position away from the former electrode. This configuration permits the release of ink colloid particles from the heating resistor layer.

In placing an upper electrode having polarity same to that of a colloidal particle and an opposite electrode having the opposite polarity as that of the colloidal particle as disclosed in Japanese Patent Laid-Open No. 2009-51146, this configuration raises the concern that the colloidal particles adhere to the opposite electrode. Japanese Patent Laid-Open No. 2009-51146 discloses that a method for solving such concern is to incorporate, into ink, molecules having the same polarity as that of the colloidal particle and being smaller than the colloidal particle or appropriately switch the direction in which electric potential is applied to the upper electrode placed on the upper layer of the heating resistor and opposite electrode.

However, in a case where the molecules smaller than the colloidal particles are incorporated into ink, the colloidal particles are unlikely to adhere to the opposite electrode, but multiple small molecules are drawn to the opposite electrode. This may reduce the area of the opposite electrode in which the opposite electrode can function as an electrode and thus produce no desired effect. Additionally, in a case of appropriately switching the direction in which electric potential is applied to the upper electrode and opposite electrode, an anodization reaction may occur between the upper electrode and ink, and the upper electrode may melt depending on the material of the electrode. This may lead to the shortened lifetime of the liquid ejecting head. In other words, even in a case where the technique disclosed in Japanese Patent Laid-Open No. 2009-51146 is used, maintaining stable ejecting operations for a long period without causing kogation has been difficult.

SUMMARY OF THE INVENTION

The present invention has been made to solve the above problem. Thus, an object of the present invention is to achieve a liquid ejecting head capable of maintaining stable ejecting operations without causing kogation.

According to a first aspect of the present invention, there is provided a liquid ejecting head comprising, in a liquid chamber including liquid: a heating resistor configured to generate thermal energy for ejecting the liquid; a first electrode placed so as to cover the heating resistor; a second electrode placed at a position different from a position at which the first electrode is placed; and a third electrode placed at a position different from the position at which the first electrode is placed and the position at which the second electrode is placed, wherein in a case where the heating resistor is driven, a voltage is applied between the first electrode and the second electrode so that the first electrode has same polarity as polarity of a predetermined component included in the liquid, and the second electrode has polarity opposite to the polarity of the predetermined component, and in a case where the heating resistor is not driven, a voltage is applied between the second electrode and the third electrode so that the second electrode has same polarity as the polarity of the predetermined component, and the third electrode has polarity opposite to the polarity of the predetermined component.

According to a second aspect of the present invention, there is provided a cleaning method for cleaning a liquid ejecting head comprising, in a liquid chamber including liquid: a heating resistor configured to generate thermal energy for ejecting the liquid; a first electrode placed so as to cover the heating resistor; and a second electrode placed at a position different from a position at which the first electrode is placed, wherein in a case where the heating resistor is driven, a voltage is applied between the first electrode and the second electrode so that the first electrode has same polarity as polarity of a predetermined component included in the liquid, and the second electrode has polarity opposite to the polarity of the predetermined component, the method comprising electrode-cleaning step in which in a case where the heating resistor is not driven, a voltage is applied between the second electrode and a third electrode so that the second electrode has same polarity as the polarity of the predetermined component, and the third electrode has polarity opposite to the polarity of the predetermined component, and the third electrode is placed at a position different from the position at which the first electrode is placed and the position at which the second electrode is placed.

According to a third aspect of the present invention, there is provided a liquid ejecting apparatus that ejects liquid in accordance with ejection data by using a liquid ejecting head comprising, in a liquid chamber including the liquid: a heating resistor configured to generate thermal energy for ejecting the liquid; a first electrode placed so as to cover the heating resistor; a second electrode placed at a position different from a position at which the first electrode is placed; and a third electrode placed at a position different from the position at which the first electrode is placed and the position at which the second electrode is placed, the apparatus comprising: a first application unit configured to apply, in a case where the heating resistor is driven, a voltage between the first electrode and the second electrode so that the first electrode has same polarity as polarity of a predetermined component included in the liquid, and the second electrode has polarity opposite to the polarity of the predetermined component; and a second application unit configured to apply, in a case where the heating resistor is not driven, a voltage between the second electrode and the third electrode so that the second electrode has same polarity as the polarity of the predetermined component, and the third electrode has polarity opposite to the polarity of the predetermined component.

Further features of the present invention will become apparent from the following description of exemplary embodiments with reference to the attached drawings.

DESCRIPTION OF THE EMBODIMENTS

Brief Overview of Inkjet Printing Apparatus

Figure 1:
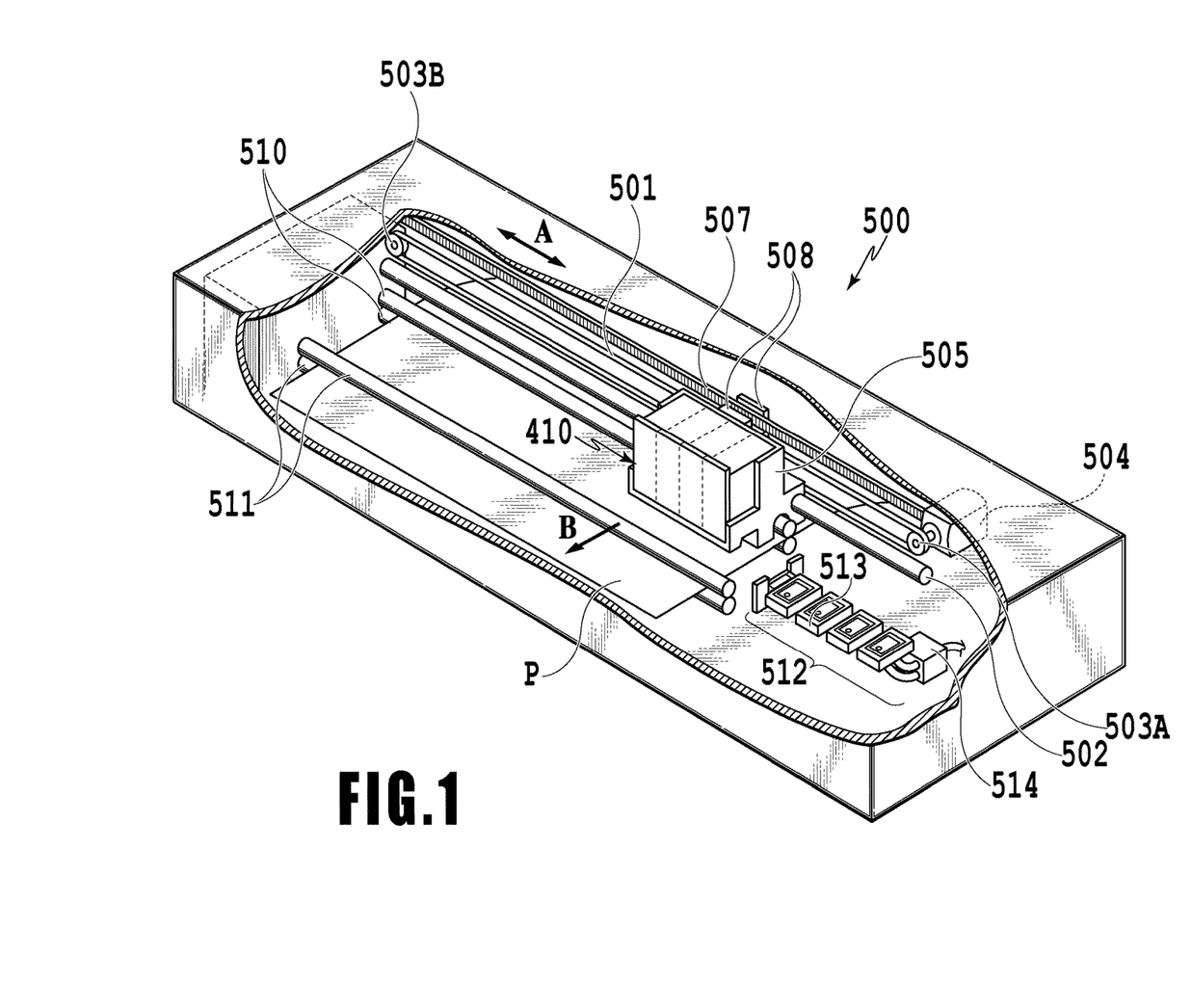
FIG. 1 is a schematic block diagram of an inkjet printing apparatus.

FIG. 1 is a schematic diagram of an inkjet printing apparatus 500 (hereinafter simply referred to as the printing apparatus), which is usable as a liquid ejecting apparatus of the present invention. A carriage 505, which has four head units 410 mounted thereon, is attached around a portion of an endless belt 501, which is wound around a driving pulley 503A and a driven pulley 503B and extends between these pulleys. The four head units 410 respectively eject cyan, magenta, yellow, and black inks. Upon rotation of the driving pulley 503A, which uses a carriage motor 504 as its driving source, the endless belt 501 moves around the driving pulley 503A and the driven pulley 503B. The carriage 505 reciprocates in the direction A of FIG. 1 while being guided and supported by a guide shaft 502.

The carriage 505 has an encoder sensor 508 attached thereto. The encoder sensor 508 detects the slits of a linear scale 507, which extends in the direction A. A controlling unit of the printing apparatus 500 is capable of identifying the position of the carriage 505 in the direction A based on a result obtained from the detection of the linear scale 507 by the encoder sensor 508.

A print medium P is nipped by a pair of conveying rollers 510 on the upstream side and a pair of conveying rollers 511 on the downstream side. This maintains the surface smoothness of the print medium positioned so as to face the ejection port surface of the head unit 410. The pair of conveying rollers 510 on the upstream side and the pair of conveying rollers 511 on the downstream side are rotated by a conveying motor 509 (not shown in FIG. 1) to convey the print medium in the direction B.

In such a configuration, the controlling unit of the printing apparatus 500 drives the carriage motor 504 and at the same time, leads the head unit 410 to eject ink to the print medium P in accordance with ejection data on the basis of the result of detection by the encoder sensor 508. This forms a one-band image on the print medium P. Subsequently, the controlling unit drives the conveying motor to convey the print medium P in the direction B by a distance corresponding to one band. Alternately repeating the printing scan and conveying operation as described above gradually forms an image on the print medium P.

The printing apparatus 500 includes a maintenance unit 512 at the home position on an end of the printing apparatus 500 in the direction A. The maintenance unit 512 is used to perform maintenance of a liquid ejecting head placed in the head unit 410. The maintenance unit 512 includes a cap member 513, which is used to protect the ejection port surface of the liquid ejecting head, and a suction pump 514, which is used to provide a negative pressure in the inside of the cap member to forcibly discharge ink from the ejection port.

Figure 2:
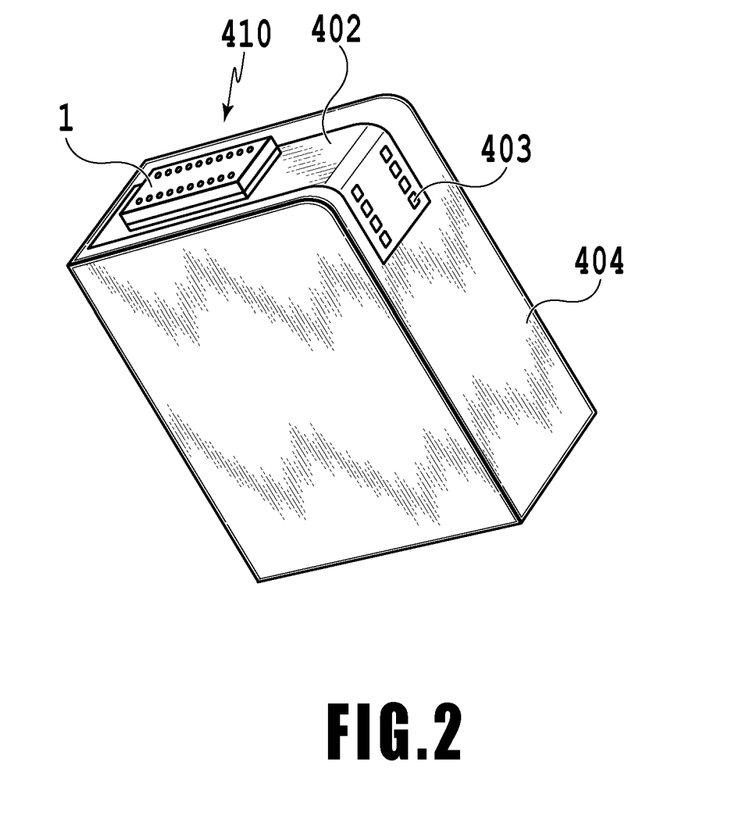
FIG. 2 is an external perspective view of a head unit.

FIG. 2 is an external perspective view of the head unit 410 for one color. The head unit 410 includes a tank 404, which contains liquid in the inside, and a liquid ejecting head 1 (hereinafter simply referred to as the ejecting head), which is attached to the tank 404 to eject the liquid. The head unit 410 includes wiring tape 402, which is provided around a portion of the head unit 410. The wiring tape 402 is used to supply the ejecting head 1 with ejection data and electric power. Additionally, the wiring tape 402 has junctions 403 formed thereon. In a case where the head unit 410 is mounted on the carriage 505, the junctions 403 are used to electrically connect the head unit 410 to the main body of the printing apparatus 500.

The foregoing describes, as an example, the head unit 410 in which the ejecting head 1 and the tank 404 are integrated. However, the ejecting head 1 and the tank 404 may be separate. One way that may be used in this case is to mount only the ejecting head 1 on the carriage 505 and supply liquid from a tank fixed at any position in the printing apparatus to the ejecting head 1, for example, through a tube. In this case, the ejecting head 1 can be in the form of one chip that is usable for four-color inks. Additionally, the applicable types and number of inks are not limited to those mentioned above. Only one color may be used, and in another embodiment, more types of ink may be included.

Figure 3:
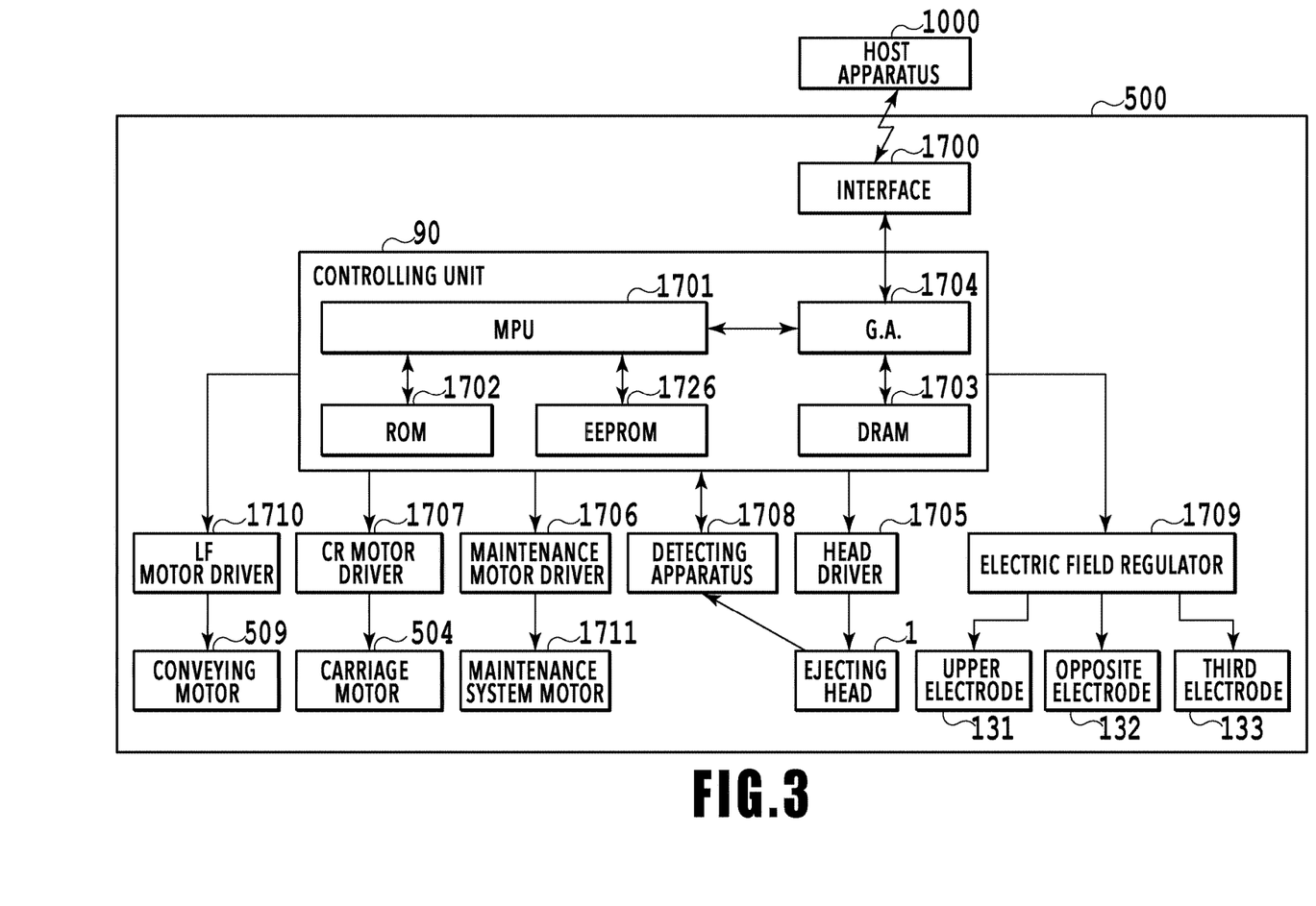
FIG. 3 is a block diagram showing the configuration of a control system in the printing apparatus.

FIG. 3 is a block diagram showing the configuration of a control system in the inkjet printing apparatus 500. An interface 1700 exchanges information between the printing apparatus 500 and a host apparatus 1000 connected to the outside. Specifically, the interface 1700 receives a print command and image data from the host apparatus 1000 and provides the host apparatus 1000 with status information on the printing apparatus. The host apparatus 1000 can be a computer, digital camera, scanner, or mobile terminal. In a case where the host apparatus 1000 issues a print command, the command is input to the printing apparatus 500 together with image data via the interface 1700.

The control unit 90 has an MPU 1701, a ROM 1702, a DRAM 1703, an EEPROM 1726, and a gate array (G.A.) 1704, and controls the entire apparatus. The EEPROM 1726 is a memory for storing information necessary for the printing apparatus 500 in a power-on state that follows a power-off state. The gate array 1704 controls data transfer among the interface 1700, MPU 1701, and DRAM 1703 under instructions from the MPU 1701.

The MPU 1701 exercises various controls in accordance with programs and parameters stored in the ROM 1702 while using the DRAM 1703 as a work area. For example, the MPU 1701 drives the carriage motor 504 via a CR motor driver 1707 to thereby move the carriage 505 in the direction A. At this time, the DRAM 1703 transfers ejection data via a head driver 1705, and the ejecting head 1 is driven. This process results in printing of a one-line image on the print medium P. The MPU 1701 also drives the conveying motor 509 via an LF motor driver 1710 for each main printing scan for one line to convey the print medium P in the direction B by a predetermined distance. Alternately repeating such a printing scan and a conveying operation forms, on the print medium P, an image in accordance with image data that has been received from the host apparatus.

At an appropriate timing, for example, a timing after the completion of a printing operation for one page, the MPU 1701 drives a recovery motor 1711 via a recovery motor driver 1706 to perform suction recovery processing on the ejecting head 1.

Furthermore, the MPU 1701 regulates electric potential applied to a first electrode 131, a second electrode 132, and a third electrode 133, which are placed within the ejecting head 1, via an electric field regulator 1709. A detecting apparatus 1708 detects the value of an electric current flowing among these electrodes and provides the controlling unit 90 with the detection result. The first, second, and third electrodes 131, 132, and 133 and the electric field regulator 1709 will be described in detail later.

The ROM 1702 stores various parameters that the MPU 1701 uses to exercise various controls as described above. Examples of the parameters can include the shape of a voltage pulse applied to the heating resistor element of the ejecting head 1, a voltage applied to the first, second, and third electrodes 131, 132, and 133 and the timing of the application, the conveying speed of the print medium P, and the scanning speed of the carriage 505.

Configuration of Ejecting Head

Figure 4:
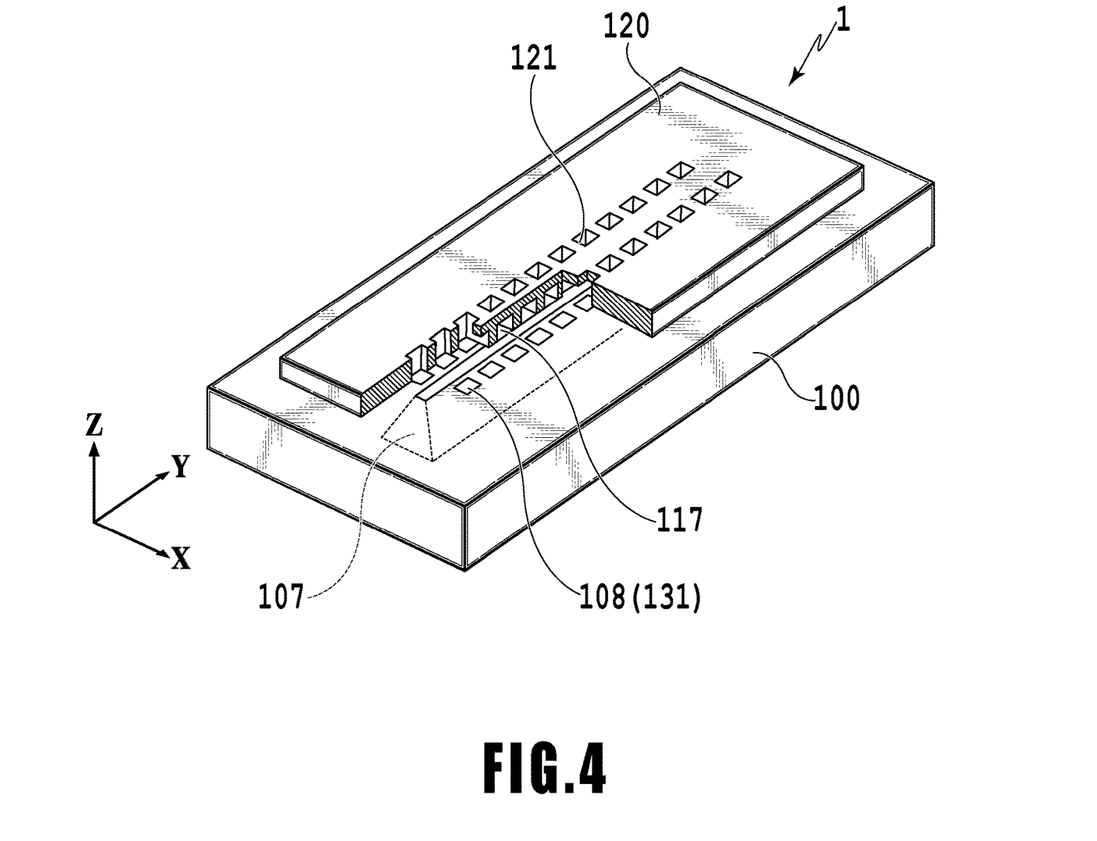
FIG. 4 is a partially broken perspective view of an ejecting head.

FIG. 4 is a partially broken perspective view of the ejecting head 1. The ejecting head 1 consists mainly of a head substrate 100 and a flow passage forming member 120. The head substrate 100 has a supply port 107 formed therein. The supply port 107 serves as a through hole through which ink supplied from the back side (the side of the direction-Z) is supplied to the flow passage forming member 120. In this embodiment, the supply port 107 extends in the longitudinal direction (direction Y). On both sides of the supply port 107, heating regions 108 are arranged at predetermined pitches in the direction Y. The heating regions 108 serve to generate thermal energy for ejecting ink.

The flow passage forming member 120 has ejection ports 121, which are formed at positions corresponding to the individual heating regions 108 of the head substrate 100 to eject ink. The flow passage forming member 120 also has liquid chambers 117 formed therein. The liquid chamber 117 serves as a flow passage that directs, to the individual ejection ports, ink supplied from the supply port 107.

In such a configuration, the ink supplied from the supply port 107 is directed to the individual liquid chambers 117 under capillary force to form a meniscus near the ejection ports 121. Upon subsequent application of a voltage pulse to the heating resistor in accordance with ejection data, the heating regions 108 rapidly generate heat and thus induce film boiling in the ink in contact with the heating regions 108 to eject a predetermined amount of ink from the ejection ports 121.

Figure 5:
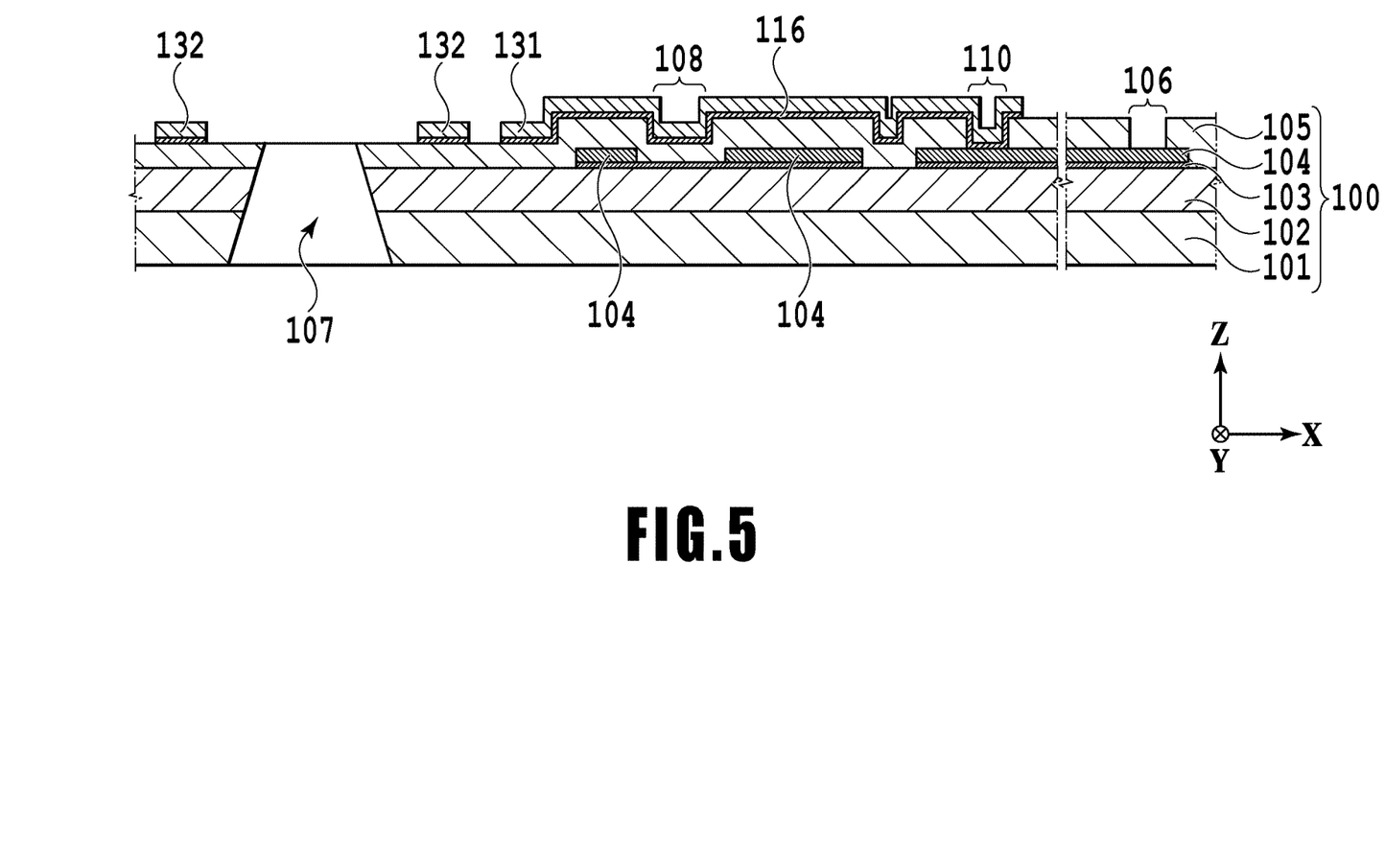
FIG. 5 is a cross-sectional view for illustrating the detailed structure of a head substrate.

FIG. 5 is a cross-sectional view for illustrating the detailed structure of the head substrate 100. The head substrate 100 includes a heat accumulation layer 102, which is placed on a silicon substrate 101 and contains an insulating material such as $SiO_2$ or SiN. On a partial surface of the heat accumulation layer 102, a heating resistor layer 103 containing a known material such as TaSiN is placed. Additionally, on a partial surface of the heating resistor layer 103, a wiring layer 104 containing a metallic material such as Al, Al—Si, or Al—Cu is formed.

Upon application of a voltage to a layer consisting of the heating resistor layer 103 and the wiring layer 104, an electric current flows along the wiring layer 104 in a region in which the wiring layer 104 is present. However, an electric current flows through the heating resistor layer 103 in a region in which the wiring layer 104 is not present. This region functions as a heating region 108 (so-called heating resistor).

In the head substrate 100 of the present embodiment, even a layer consisting of the heating resistor layer 103 and the wiring layer 104 includes a region containing the heating region 108 and a region that is electrically separated from the heating region 108. The region containing the heating region 108 is used as wiring for an ejecting operation performed in accordance with ejection data, whereas the region containing no heating region 108 is used as wiring for applying a voltage to the first, second, and third electrodes.

A protective layer 105, which contains an insulating material such as $SiO_2$ or SiN, is formed as an upper layer that covers the heat accumulation layer 102 and includes a region in which the heating resistor layer 103 and the wiring layer 104 are placed. In practical usage of the ejecting head 1, a surface of the head substrate 100 is brought into contact with ink flowing through the liquid chamber 117. However, the protective layer 105 prevents the exposure of the heating resistor layer 103 and the wiring layer 104 to ink, and only the generated heat is transferred to the ink. In this regard, in an end region of the head substrate 100 on which no flow passage forming member 120 is stacked, a through hole is formed. In the through hole, the wiring layer having no protective layer 105 placed thereon is exposed. The through hole serves as a terminal 106 for allowing an electric current to flow through the wiring layer 104. The material of the protective layer 105 is not limited to that mentioned above. However, the protective layer 105, which will have a temperature raised to about 700° C. and will be brought into contact with ink, is required to have good layer properties, for example, good heat resistance, mechanical characteristics, chemical stability, and alkaline resistance.

On a partial surface of the protective layer 105, an adhesion layer 116 is placed to increase adhesiveness between the protective layer 105 and an electrode layer. The adhesion layer 116 is stacked on the protective layer 105 in regions on which the upper electrode 131, which serves as the first electrode, the opposite electrode 132, which serves as the second electrode, and the third electrode 133 (not shown in FIG. 5) are each placed in a layer form. The adhesion layer 116 also constitutes part of a wiring route for applying a voltage to the electrode layer and is electrically connected to the wiring layer in the through hole 110, which is formed through the protective layer 105.

The material of such an adhesion layer 116 is not limited to a particular material as long as it is an electrically conductive material having high thermal conductivity that allows the transfer of heat generated in the heating regions 108 to ink while minimizing heat loss. However, in a case where the adhesion layer 116 is partially brought into contact with liquid within the liquid chamber, the material of the adhesion layer 116 preferably has liquid resistance. For example, metallic materials such as tantalum and niobium can form a passivation film on a surface of the layer even in the application of a high voltage to ink in cleaning that will be described later and can be preferably used.

Next, the three types of electrodes in the present embodiment will be described below. The upper electrode 131, which serves as the first electrode, is an electrode stacked so as to cover the top of the heating region 108. The upper electrode 131 in the present embodiment, which does not mainly attract anions contained in ink, functions as a negative electrode. In addition, the upper electrode 131 is required to play a role in protecting the heating regions 108 from physical and chemical impacts and to have thermal conductivity that allows heat generated in the heating regions 108 to be instantaneously transferred to ink. The upper electrode 131 is also required to be formed of a material that forms no strong oxide film through heating at about 700° C. The material of such an upper electrode 131 is, for example, Ir or Ru alone, or an alloy of Ir and another metal or an alloy of Ru and another metal.

To make anions in ink distant from the upper electrode 131, the opposite electrode 132, which serves as the second electrode, is an electrode that functions as a positive electrode during a printing operation. To maintain a stable electric field between the upper electrode 131 and the third electrode 133, the opposite electrode 132 is preferably formed of a material containing a metal that is unlikely to form an oxide film having low electrical conductivity and to melt through an electrochemical reaction.

The third electrode 133 (not shown in FIG. 5) is an electrode for use in cleaning of the opposite electrode 132. The cleaning of the opposite electrode 132 means performing switching of the opposite electrode 132, which has served as a positive electrode, to a negative electrode to release anions and colloidal particles having an electric charge on their surfaces that have been attracted to the opposite electrode 132 and then adhered thereto. In this embodiment, the third electrode 133 is prepared as a positive electrode for use in such electrode cleaning. Conducting the electrode cleaning enables the opposite electrode 132 to maintain its function as an electrode, maintaining a normal electric field between the upper electrode 131 and the opposite electrode 132 during a printing operation.

One way that may be used to simply detach anions and colloidal particles from the opposite electrode 132 is to simply reverse the polarity of the upper electrode 131 and the polarity of the opposite electrode 132 as disclosed in Japanese Patent Laid-Open No. 2009-51146. However, using the upper electrode 131 as a positive electrode may cause the upper electrode 131 to melt through an anodization reaction. In view of the situation that the opposite electrode 132 is cleaned on the premise of preventing kogation in the heating regions 108, it is meaningful to prepare the third electrode 133 in order to detach anions and colloidal particles from the opposite electrode 132.

The material of the third electrode 133 is not limited to a particular material as long as it is electrically stable even in a case where it is brought into contact with liquid. The third electrode 133 can be formed of the same metallic material as that of the upper electrode 131 or a different metallic material. Like the upper electrode 131, the third electrode 133 also raises the concern that the electrode per se melts through an anodization reaction. However, even if the layer thickness of the third electrode 133 gradually decreases as the number of cleaning operations increases, this decrease is not problematic as long as the inherent function of the electrode is not impaired.

Figure 6:
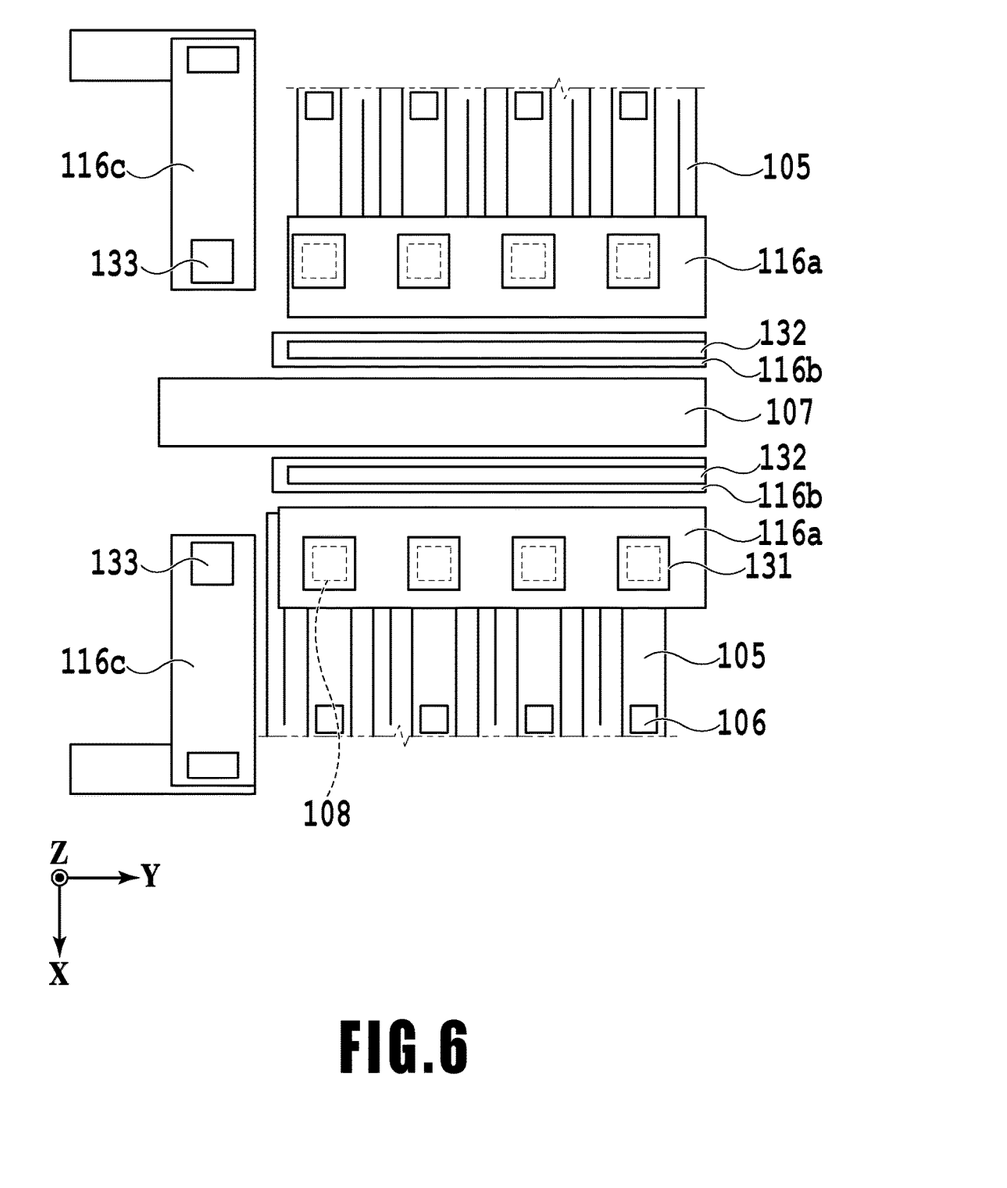
FIG. 6 is a layout chart of wiring in the head substrate.

FIG. 6 is a layout chart of wiring in the head substrate 100 in the present embodiment. A plurality of the heating regions 108 is arranged on both sides of the ink supply port 107, which extends in the direction Y. Adhesion layers 116a are formed so as to individually cover the plurality of the heating regions 108. The adhesion layer 116a also has the upper electrodes 131 formed thereon, and the upper electrodes 131 are placed at positions corresponding to the individual heating regions 108.

On the inward side of two arrays of the upper electrodes 131 on both sides of the ink supply port 107, adhesion layers 116b and the opposite electrodes 132 (second electrodes) are formed so as to extend in the direction Y. Additionally, adhesion layers 116c and the third electrodes 133 are formed on an end of the direction Y, in which the upper electrodes 131 are arranged. In this example, the third electrode 133 has an area smaller than that of the opposite electrode 132.

Referring to FIG. 5, the wiring layer 104 to which the upper electrode 131 is connected via the adhesion layer 116a, the wiring layer 104 to which the opposite electrode 132 is connected via the adhesion layer 116b, and the wiring layer 104 to which the third electrode 133 is connected via the adhesion layer 116c are electrically separated from one another. These three sets of wiring are each connected to an individual terminal 106.

Figure 7:
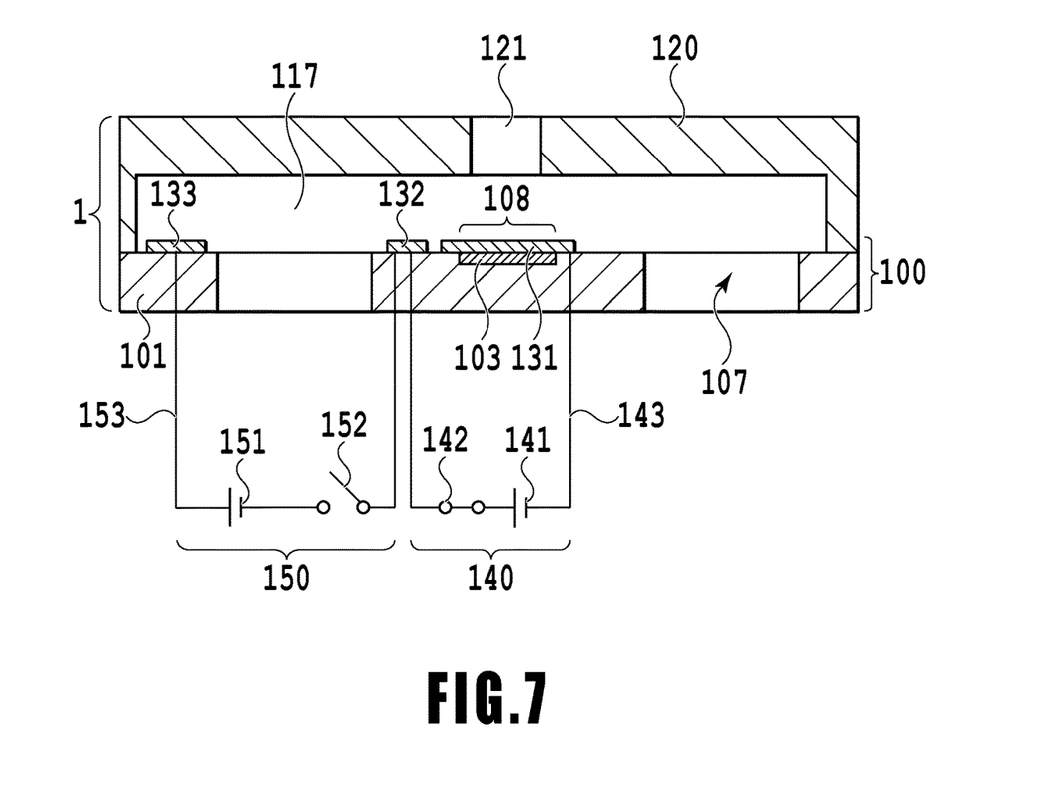
FIG. 7 is a circuit block diagram of an upper electrode, an opposite electrode, and a third electrode.

FIG. 7 is a circuit block diagram of the upper electrode 131, the opposite electrode 132, and the third electrode 133. The upper electrode 131 and the opposite electrode 132 are electrically connected by a wiring route 143, which passes through a power source 141 and a switch 142, and an electrically closed circuit is formed by including ink in a liquid chamber 117. Such a closed circuit is referred to as a kogation preventing unit 140 in the present embodiment. In the kogation preventing unit 140, the upper electrode 131, the opposite electrode 132, and the wiring layer 104, which constitute part of the wiring route 143, are placed in the ejecting head 1. The remaining portion of the wiring route 143, the switch 142, and the power source 141 are placed in the outside of the ejecting head 1. In this regard, the switch 142 can be placed on the ejecting head 1.

Upon closure of the switch 142 in the kogation preventing unit 140, the upper electrode 131 serves as a negative electrode, and the opposite electrode 132 serves as a positive electrode. In this configuration, anions and negative colloidal particles in the liquid chamber move away from the upper electrode 131 toward the opposite electrode 132. Under the electric field formed in the above manner, ink components are unlikely to adhere to the heating region 108, and this unlikeliness leads to the prevention of kogation, even in a case where an electric current flows through the heating resistor layer 103 to cause the heating region 108 to rapidly generate heat.

Meanwhile, the opposite electrode 132 and the third electrode 133 are electrically connected by a wiring route 153, which passes through a power source 151 and a switch 152, and an electrically closed circuit is formed by including ink in the liquid chamber 117. Such a closed circuit is referred to as an electrode cleaning unit 150 in the present embodiment. In the electrode cleaning unit 150, the opposite electrode 132, the third electrode 133, and the wiring layer 104, which constitutes part of the wiring route 153, are placed in the ejecting head 1. The remaining portion of the wiring route 153, the switch 152, and the power source 151 are placed in the outside of the ejecting head 1. In this regard, the switch 152 can be placed on the ejecting head 1.

Upon closure of the switch 152 in the electrode cleaning unit 150, the opposite electrode 132 serves as a negative electrode, and the third electrode 133 serves as a positive electrode. In this configuration, anions and negative colloidal particles in the liquid chamber move away from the opposite electrode 132 toward the third electrode 133. At this time, the kogation preventing unit 140 opens the switch 142 and thus forms no active electric field between the upper electrode 131 and the opposite electrode 132.

During an ejecting operation of the ejecting head 1 in the present embodiment, the controlling unit 90 adopts a kogation preventing mode to close the switch 142 and open the switch 152. This allows ink components to move toward the opposite electrode 132 without adhering to the heating region 108 even under heating by the heating region 108, thus preventing kogation.

After a predetermined number of ejecting operations are performed to form an anion membrane on the opposite electrode 132, the controlling unit 90 determines that the opposite electrode 132 needs to be cleaned. At an appropriate timing at which no printing operation is performed, the controlling unit 90 subsequently applies electrode-cleaning processing to open the switch 142 and close the switch 152. As a result of this processing, anions that have adhered to the opposite electrode 132 because of kogation-preventing processing move away from the opposite electrode 132 toward the third electrode 133.

In addition, a voltage applied between the opposite electrode 132 and the third electrode 133 in such electrode-cleaning processing is preferably set to a value higher than a voltage applied between the upper electrode 131 and the opposite electrode 132 in the kogation-preventing processing. This setting can reliably produce the effect of the electrode cleaning in a shorter time. In this regard, even in a case where a high voltage is not applied, the effect of the cleaning can be improved by increasing the time for which a voltage is applied.

Additionally, in the electrode-cleaning processing, the polarity of the opposite electrode 132 and the polarity of the third electrode may be reversed appropriately or periodically. Repeating the reversal of polarity prevents anions from adhering to any of the electrodes, holding promise for releasing the anions into ink.

Figure 8:
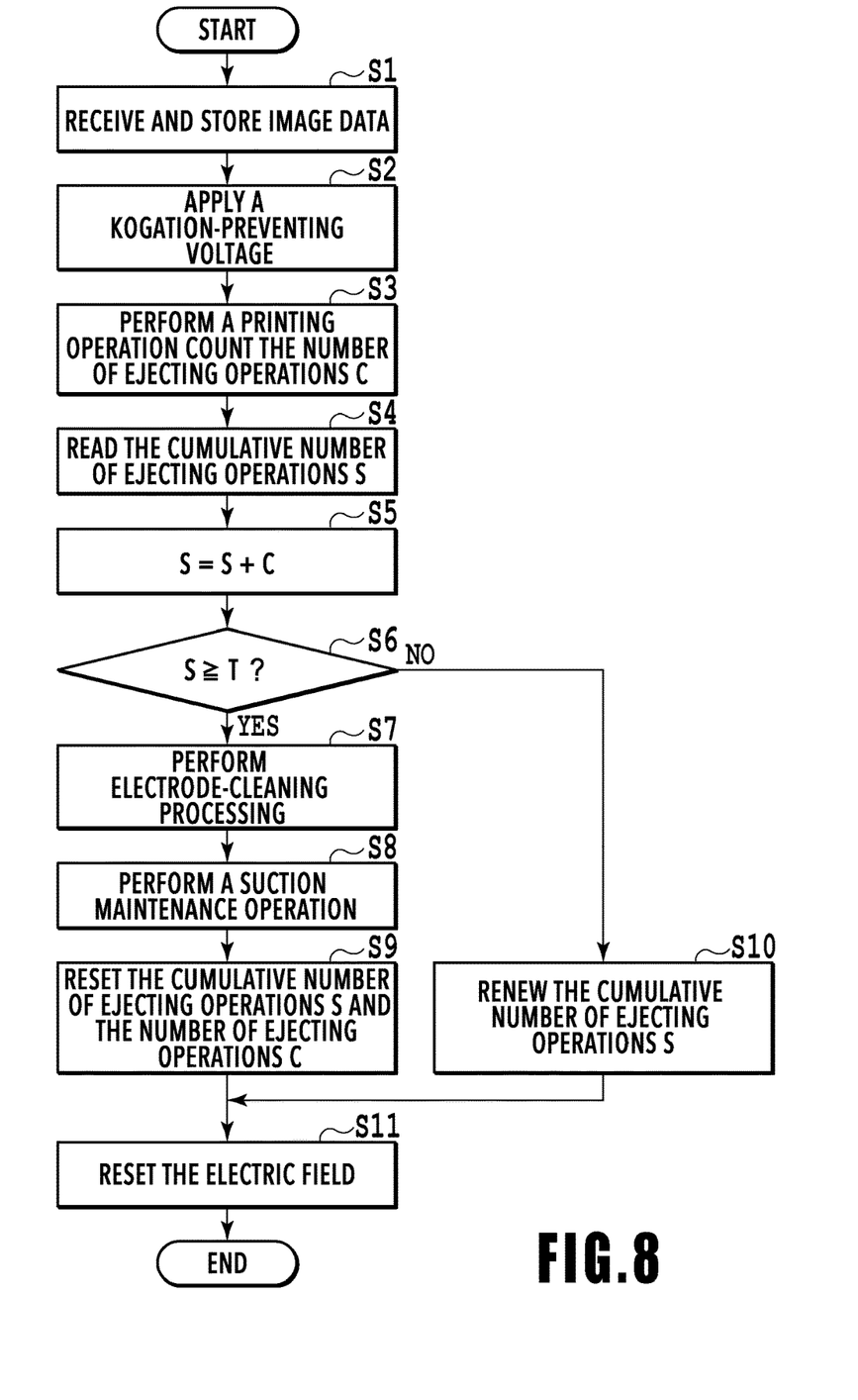
FIG. 8 is a flowchart for illustrating processing performed in a case where a print command is input.

FIG. 8 is a flowchart for illustrating processing performed by the MPU 1701 of the controlling unit 90 in accordance with a program stored in the ROM 1702 in a case where a print command is input by the host apparatus 1000. Upon inputting of a print command by the host apparatus 1000, the MPU 1701 first stores, in the DRAM 1703, image data received from the interface 1700 via the gate array 1704 in step S1.

In step S2, the MPU 1701 uses the electric field regulator 1709 to close the switch 142 and open the switch 152. This allows the upper electrode 131 to serve as a negative electrode and the opposite electrode 132 to serve as a positive electrode in the ejecting head 1.

In step S3, the MPU 1701 performs a printing operation in accordance with the image data stored in the DRAM 1703. At this time, the MPU 1701 also counts the number of ejecting operations, C, of the ejecting head.

Upon completion of the predetermined printing operation, the MPU 1701 advances to step S4 and reads the cumulative number of ejecting operations, S, stored in the DRAM 1703. In subsequent step S5, the number of ejecting operations, C, obtained in step S3 is added to the cumulative number of ejecting operations, S, read in step S4. The value resulting from the addition is used as a new value of the cumulative number of ejecting operations, S.

In subsequent step S6, the MPU 1701 determines whether the cumulative number of ejecting operations, S, obtained in step S5 is a threshold T or more (a predetermined number or more) stored in advance. In this embodiment, the threshold T corresponds to the number of ejecting operations at which it is determined that the electrode-cleaning processing is needed because of more ink components adhering to the opposite electrode 132. In a case where the MPU 1701 determines that the cumulative number of ejecting operations, S, is the threshold T or more in step S6, the MPU 1701 advances to step S7 and performs the electrode-cleaning processing. Specifically, the MPU 1701 opens the switch 142 and closes the switch 152 and then maintains this state for a predetermined time. This allows the opposite electrode 132 to serve as a negative electrode and the third electrode 133 to serve as a positive electrode in the ejecting head 1. Thus, the ink components that have adhered to the opposite electrode 132, which served as a positive electrode during the printing operation, are released from the opposite electrode 132, which has been changed to a negative electrode, and then move toward the third electrode 133, which has been changed to a positive electrode.

Subsequently, the MPU 1701 advances to step S8 and performs a suction recovering operation. Specifically, the MPU 1701 drives the carriage motor 504 via the CR motor driver 1707 and moves the carriage 505 to the home position. The MPU 1701 then drives the recovery motor 1711 via the recovery motor driver 1706 while bringing the cap member 513 into contact with the ejection port surface of the ejecting head 1 to forcibly discharge ink from the ejection port. Such a suction operation eliminates the ink within the liquid chamber, which contains a component that may cause kogation, and provides a new ink flow into the chamber. Subsequently, the MPU 1701 advances to step S9 and resets the cumulative number of ejecting operations, S, and the count value of the number of ejecting operations, C.

In contrast, in a case where the MPU 1701 determines that the cumulative number of ejecting operations, S, is less than the threshold T in step S6, the MPU 1701 advances to step S10 and stores the current cumulative number of ejecting operations, S, in the DRAM and then jumps to step S11.

In subsequent step S11, the MPU 1701 opens both the switch 142 and the switch 152 to reset the electric field in the liquid chamber, thereby finishing the present processing.

The present embodiment as described above enables stable ejecting operations to be maintained for a long period without causing kogation in the ejecting head 1.

In the flowchart illustrated in FIG. 8, whether to perform the electrode-cleaning processing is determined based on the cumulative number of ejecting operations, S, of the ejecting head 1. However, the present invention is not limited to such an embodiment. For example, the electrode-cleaning processing may be performed at a timing after a predetermined time from the timing at which the previous electrode-cleaning processing was performed.

Additionally, whether to perform the electrode-cleaning processing may be determined based on, for example, an electric current value detected by the detecting apparatus 1708. Maintaining a state in which a predetermined voltage is applied between the upper electrode 131 and the opposite electrode 132 leads to a gradual increase in ink components adhering to the opposite electrode 132 and, in turn, to a reduction in the area of the electrode in which it functions as an electrode. This lowers an electric current value detected by the detecting apparatus 1708. In view of such a situation, the MPU 1701 may be configured to perform electrode-cleaning processing in a case where an electric current value detected by the detecting apparatus 1708 is a predetermined value or less. Another way that may be used is to determine whether to perform the electrode-cleaning processing based on both the cumulative number of ejecting operations, S, and the electric current value.

In a case where the detecting apparatus 1708 is mounted, the MPU 1701 can use not only an electric current value during the kogation-preventing processing but also an electric current value during the electrode-cleaning processing. For example, one effective way is to calculate the amount of layer loss of the third electrode based on an electric current value and then adjust, for example, the frequency of the electrode cleaning and a voltage to be applied, depending on the amount of layer loss.

In using the ejecting heads 1 for four colors as in the present embodiment, it is efficient to perform the electrode-cleaning processing of step S7 and the suction maintenance processing of step S8 for the four ejecting heads 1 all at once. Thus, steps S7 and S8 may be performed in a case where any one of the ejecting heads has a value of the cumulative number of ejecting operations, S, that exceeds the threshold T or in a case where an electric current value detected by the detecting apparatus 1708 in any one of the ejecting heads 1 is a predetermined value or less.

Additionally, the above flowchart has been described as an embodiment that includes performing electrode cleaning at the timing at which some ink components are regarded as having adhered to the opposite electrode 132 because of the printing operation. However, the electrode cleaning may be performed before the printing operation.

Moreover, in the above embodiment, whether to perform electrode cleaning is determined for each print command. This determination can be made for each page or for each printing scan. Another method that may be used is to pressurize an ink flow passage from the upstream side of the ejecting head 1 in place of the suction maintenance operation performed in step S8.

Figure 9:
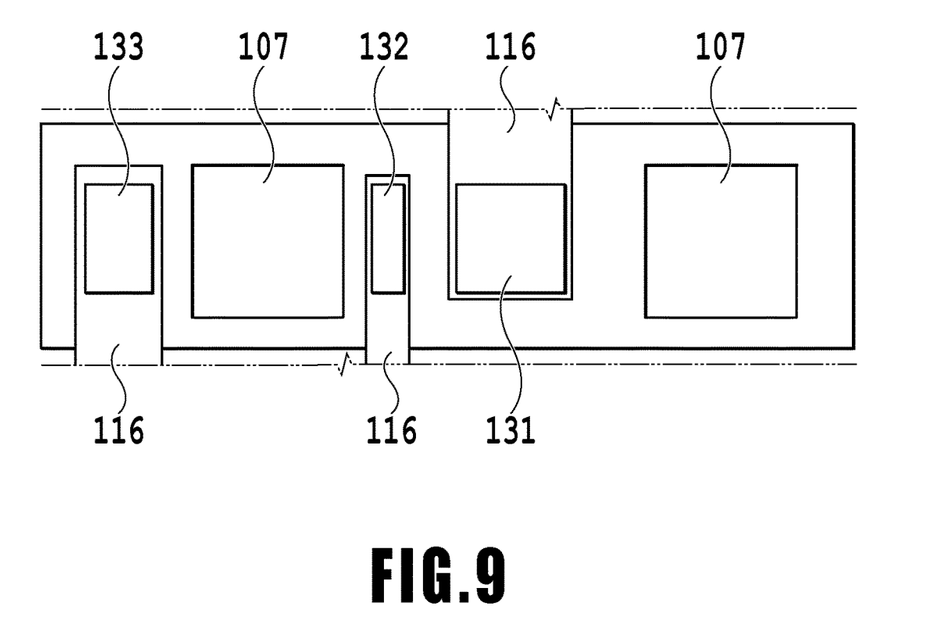
FIG. 9 is another exemplary layout chart of wiring in the head substrate.

Additionally, as described above, the upper electrode 131, the opposite electrode 132, and the third electrode 133 are placed as shown in FIG. 6. Of course, the present invention is not limited to such a layout. The three types of electrodes may be placed in any layout as long as they are placed within the same liquid chamber of the same ejecting head. For example, in FIG. 6, the position of the opposite electrode 132 may be exchanged for the position of the third electrode 133. For example, another layout that may be used is to prepare one opposite electrode 132 and one third electrode 133 for each of a plurality of the upper electrodes 131 and place the third electrode 133 on the side of the opposite electrode 132 opposite to the upper electrode 131, as shown in FIG. 9. This layout allows the movement directions of ink components to be adjusted to one direction; that is, ink components in the kogation-preventing processing move from the upper electrode 131 to the opposite electrode 132, and ink components in the electrode-cleaning processing move from the opposite electrode 132 to the third electrode.

In addition, the foregoing describes, as an example, a serial-type inkjet printing apparatus in which the ejecting head 1 shown in FIG. 4 is prepared for each of four colors and mounted on the carriage 505, which moves in the direction A, as shown in FIG. 1. However, the present invention is not limited to such an embodiment. For example, the ejecting head 1 may be designed as an elongated ejecting head 1 in which the head substrate 100 and flow passage forming member 120 as shown in FIG. 4 are further connected in series so that the ejecting head ejects an ink of the same color or inks of different colors. Furthermore, in using an elongated ejecting head for one color, one design that can be used is a full-line-type inkjet printing apparatus in which the elongated ejecting head is prepared for each of four colors and fixed within the printing apparatus and is configured to eject, at a predetermined frequency, ink to a print medium being conveyed.

Moreover, liquid ejected by the ejecting head 1 may not necessarily be ink containing a coloring material. Additionally, the components contained in the liquid may not include an anion or colloidal particle having a negative surface. For cation components and colloidal particles each having a positive surface, an effect equivalent to that described above can be obtained by placing the power sources 141 and 151 so that their plus and minus terminals are aligned in the order opposite to that shown in the circuit block diagram of FIG. 7.

In any case, the present invention can be effectively achieved by including a liquid ejecting head that uses a heating resistor to eject liquid and is configured to eject liquid containing a substance having electrical polarity.

A plurality of verification examples conducted to verify the effect of the present invention will hereinafter be described together with comparative examples.

Verification Example 1

Configuration of Ejecting Head

A heat-accumulating layer 102 containing $SiO_2$, a heating resistor layer 103 containing TaSiN, a wiring layer 104 containing Al, and a protective layer 105 containing SiN were sequentially stacked on a silicon substrate 101. At this time, the wiring layer 104 was partially etched and removed. The portion in which the heating resistor layer 103 was exposed was used as a heating region 108 for generating ejection energy. On the protective layer 105, tantalum was subsequently deposited as an adhesion layer 116 so as to have a thickness of 100 nm, and then an iridium film with a thickness of 50 nm was formed. The iridium film was patterned to form an upper electrode 131, an opposite electrode 132, and a third electrode 133, affording a head substrate 100.

Additionally, a flow passage forming member 120 was formed, and then other necessary terminals were formed. This process afforded an ejecting head 1.

Electrode-Cleaning Processing

A head unit was formed by connecting a tank 404 containing an ink of a cyan pigment to the above ejecting head 1. The head unit was mounted on the carriage 505 of an inkjet printing apparatus 500. Subsequently, a voltage of 1 V was applied between the upper electrode 131 and the opposite electrode 132 so that the opposite electrode served as a positive electrode. In this state, the ejecting head 1 underwent $10^9$ (one billion) ejecting operations. The liquid chamber was then purged with clear ink, and the surface states of the heating region 108 and the opposite electrode 132 were observed. In this observation, no kogation was found on the heating region 108, but a thin, substantially uniform deposit of the pigment component was found on the opposite electrode 132.

Subsequently, the ejecting head 1 was purged with the cyan pigment ink again, and then a voltage of 2 V was applied between the opposite electrode 132 and the third electrode 133 for 10 seconds so that the third electrode served as a positive electrode, followed by a suction maintenance operation of the ejecting head 1. The liquid chamber was then purged with the clear ink again, and the surface states of the electrodes were observed. This observation showed that the pigment component adhering to the opposite electrode 132 had been removed. For the third electrode 133, no ink adherence or layer loss was found.

Furthermore, the liquid chamber was purged with the cyan pigment ink again, and a voltage of 1 V was applied between the upper electrode 131 and the opposite electrode 132 so that the opposite electrode 132 served as a positive electrode, followed by $10^9$ ejecting operations of the ejecting head 1. Subsequently, an ordinary printing operation was performed in accordance with image data, affording an output image with good quality.

Verification Example 2

An ejecting head 1, a cyan pigment ink, and a printing apparatus 500 similar to those described in Verification Example 1 were used, and a voltage of 1 V was applied between an upper electrode 131 and an opposite electrode 132 so that the opposite electrode 132 served as a positive electrode. In this state, the ejecting head 1 underwent $10^9$ ejecting operations. The liquid chamber was then purged with clear ink, and the surface states of a heating region 108 and the opposite electrode 132 were observed. In this observation, no kogation was found on the heating region 108, but a thin, substantially uniform deposit of the pigment component was found on the opposite electrode 132.

Subsequently, the ejecting head 1 was purged with the cyan pigment ink again, and then a voltage of 2 V was applied between the opposite electrode 132 and a third electrode 133 for 300 seconds so that the third electrode served as a positive electrode, followed by suction maintenance processing of the ejecting head 1. The liquid chamber was then purged with the clear ink again, and the surface states of the electrodes were observed. This observation showed that the pigment component adhering to the opposite electrode 132 had been removed. For the third electrode 133, the pigment ink thinly adhered thereto, but no layer loss was found.

Furthermore, the liquid chamber was purged with the cyan pigment ink again, and a voltage of 1 V was applied between the upper electrode 131 and the opposite electrode 132 so that the opposite electrode 132 served as a positive electrode, followed by $10^9$ ejecting operations of the ejecting head 1. Subsequently, an ordinary printing operation was performed in accordance with image data, affording an output image with good quality.

In this verification example, the time of the electrode-cleaning processing, that is, the time for which the voltage was applied between the opposite electrode 132 and the third electrode 133, was set to a time longer than that described in Verification Example 1. This setting resulted in the adherence of the pigment ink to the third electrode 133, which was not found in Verification Example 1. However, the adherence per se of the pigment ink to the third electrode 133 does not exert a particular influence on ejecting operations in the heating region 108. Thus, images output by the printing apparatus maintain the initial quality.

In conducting electrode cleaning again, the third electrode can also suitably maintain its function as an electrode through adjustment of the method for applying a voltage, for example, selection of a high voltage and a short time.

Verification Example 3

An ejecting head 1, a cyan pigment ink, and a printing apparatus 500 similar to those described in Verification Example 1 were used, and a voltage of 1 V was applied between an upper electrode 131 and an opposite electrode 132 so that the opposite electrode served as a positive electrode. In this state, the ejecting head 1 underwent $10^9$ ejecting operations. The liquid chamber was then purged with clear ink, and the surface states of a heating region 108 and the opposite electrode 132 were observed. In this observation, no kogation was found on the heating region 108, but a thin, substantially uniform deposit of the pigment component was found on the opposite electrode 132.

Subsequently, the ejecting head 1 was purged with the cyan pigment ink again, and then a voltage of 10 V was applied between the opposite electrode 132 and a third electrode 133 for 1 second so that the third electrode served as a positive electrode, followed by suction maintenance processing of the ejecting head. The liquid chamber was then purged with the clear ink again, and the surface states of the electrodes were observed. This observation showed that the pigment component adhering to the opposite electrode 132 had been removed. However, the third electrode 133 had pigment ink firmly attached thereto.

Subsequently, the liquid chamber was purged with the cyan pigment ink again, and a voltage of 10 V was applied between the opposite electrode 132 and the third electrode 133 for 0.5 second so that the third electrode served as a negative electrode, followed by suction maintenance processing of the ejecting head. The liquid chamber was then purged with the clear ink again, and the surface states of the electrodes were observed. This observation showed that the pigment ink firmly attached to the third electrode 133 had been removed. For the opposite electrode 132, no adherence was found.

Furthermore, the liquid chamber was purged with the cyan pigment ink again, and a voltage of 1 V was applied between the upper electrode 131 and the opposite electrode 132 so that the opposite electrode served as a positive electrode. The ejecting head 1 then underwent $10^9$ ejecting operations. Subsequently, a printing operation was performed in an ordinary manner in accordance with image data, affording an output image with good quality.

Additionally, 25 cycles of the following series of the steps were conducted: "performing $10^9$ ejecting operations together with kogation-preventing processing," "applying a voltage of 10 V for 1.0 second using the third electrode as a positive electrode," "applying a voltage of 10 V for 0.5 second using the third electrode as a negative electrode," and "performing a suction maintenance operation." Subsequently, the liquid chamber was purged with the clear ink, and the surface states of the electrodes were observed. This observation showed that no pigment ink had adhered to the opposite electrode 132 or the third electrode 133. For both the opposite electrode 132 and the third electrode 133, some layer loss was found, but output images had quality equivalent to the initial quality.

Comparative Example 1

An ejecting head 1, a cyan pigment ink, and a printing apparatus 500 similar to those described in Verification Example 1 were used, and a voltage of 1 V was applied between an upper electrode 131 and an opposite electrode 132 so that the opposite electrode 132 served as a positive electrode. In this state, the ejecting head 1 underwent $10^9$ ejecting operations. Subsequently, the ejecting head 1 underwent $10^9$ ejecting operations under the same conditions, and then an ordinary printing operation was performed in accordance with image data, affording an output image having impaired quality as compared with the initial condition. The liquid chamber was purged with clear ink, and the surface states of a heating region 108 and the opposite electrode 132 were observed. In this observation, kogation was found on the heating region 108, and a pigment component deposit was found on the surface of the opposite electrode 132.

Comparative Example 2

An ejecting head 1, a cyan pigment ink, and a printing apparatus 500 similar to those described in Verification Example 1 were used, and a voltage of 1 V was applied between an upper electrode 131 and an opposite electrode 132 so that the opposite electrode served as a positive electrode. In this state, the ejecting head 1 underwent $10^9$ ejecting operations. Subsequently, an ordinary printing operation was performed in accordance with image data, affording an image with good quality comparable to the initial quality. In this state, the liquid chamber was purged with clear ink, and the surface states of the electrodes were observed. In this observation, no kogation was found on the upper electrode 131, but the ink component thinly adhered to the surface of the opposite electrode 132.

Next, a voltage of 10 V was applied between the upper electrode 131 and the opposite electrode 132 for 1 second so that the opposite electrode served as a negative electrode. Subsequently, the liquid chamber was purged with the clear ink, and the surface states of the electrodes were observed. This observation showed that the pigment component adhering to the opposite electrode 132 had been removed. However, the ink was firmly attached to the surface of the upper electrode 131.

Subsequently, the ejecting head 1 was purged with the cyan pigment ink again, and then a voltage of 10 V was applied between the upper electrode 131 and the opposite electrode 132 for 0.5 second so that the opposite electrode 132 served as a positive electrode. The liquid chamber was then purged with the clear ink again, and the surface states of the electrodes were observed. This observation showed that the pigment ink firmly attached to the upper electrode 131 had been removed. For the opposite electrode 132, no adherence was found.

Additionally, 25 cycles of the following series of the steps were conducted: "performing $10^9$ ejecting operations together with kogation-preventing processing," "applying a voltage of 10 V for 1.0 second using the opposite electrode as a negative electrode," "applying a voltage of 10 V for 0.5 second using the opposite electrode as a positive electrode," and "performing a suction maintenance operation." Subsequently, the liquid chamber was purged with the clear ink, and the surface states of the electrodes were observed. In this observation, no ink adherence was found on the upper electrode 131 or the opposite electrode 132, but the electrode layers of the upper electrode 131 and the opposite electrode 132 each had a reduced layer thickness. Additionally, an ordinary printing operation was performed in accordance with image data, and disconnection occurred immediately after the beginning of ejection. Observing the vicinity of a heating region 108 showed that disconnection had been caused by cavitation.

In this comparative example, kogation was successfully prevented by the method similar to that disclosed in Japanese Patent Laid-Open No. 2009-51146. However, an anodization reaction occurred between ink and each of the upper electrode 131 and the opposite electrode 132. This reaction caused the electrode layers to melt, leading to cavitation in the heating region 108.

As described above, through the preparation of the third electrode in addition to the upper electrode and the opposite electrode, the present invention has enabled cleaning of the opposite electrode to be conducted as appropriate while maintaining cavitation resistance in the heating region, resulting in maintained stable ejecting operations without causing kogation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-110002, filed Jun. 2, 2017, which is hereby incorporated by reference herein in its entirety.

What is claimed is:

1. A liquid ejecting head comprising, in a liquid chamber including liquid:
   a heating resistor configured to generate thermal energy for ejecting the liquid;
   a first electrode placed so as to cover the heating resistor;
   a second electrode placed at a position different from a position at which the first electrode is placed; and
   a third electrode placed at a position different from the position at which the first electrode is placed and the position at which the second electrode is placed,
   wherein
   in a case in which the heating resistor is driven, a voltage is applied between the first electrode and the second electrode so that the first electrode has a same polarity as a polarity of a predetermined component included in the liquid, and the second electrode has a polarity opposite to the polarity of the predetermined component, and
   in a case in which the heating resistor is not driven, a voltage is applied between the second electrode and the third electrode so that the second electrode has a same polarity as the polarity of the predetermined component, and the third electrode has a polarity opposite to the polarity of the predetermined component.

2. The liquid ejecting head according to claim 1, wherein the voltage applied between the second electrode and the third electrode is higher than that applied between the first electrode and the second electrode.

3. The liquid ejecting head according to claim 1, wherein the polarity of the second electrode and the polarity of the third electrode can be reversed.

4. The liquid ejecting head according to claim 1, wherein the liquid is ink including a coloring material, and the predetermined component is an ion or colloidal particle of the coloring material, having an electric charge on a surface of the colloidal particle.

5. The liquid ejecting head according to claim 1, wherein the first electrode is placed on each of a plurality of the heating resistors.

6. The liquid ejecting head according to claim 1, wherein the second electrode extends in a direction in which a plurality of the heating resistors is arranged.

7. The liquid ejecting head according to claim 6, wherein the third electrode has an area smaller than an area of the second electrode.

8. The liquid ejecting head according to claim 1, wherein the third electrode is placed on a side of the second electrode opposite to the first electrode.

9. A cleaning method for cleaning a liquid ejecting head comprising, in a liquid chamber including liquid:
   a heating resistor configured to generate thermal energy for ejecting the liquid;
   a first electrode placed so as to cover the heating resistor;
   a second electrode placed at a position different from a position at which the first electrode is placed; and
   a third electrode placed at a position different from the position at which the first electrode is placed and the position at which the second electrode is placed,
   wherein in a case in which the heating resistor is driven, a voltage is applied between the first electrode and the second electrode so that the first electrode has a same polarity as a polarity of a predetermined component included in the liquid, and the second electrode has a polarity opposite to the polarity of the predetermined component, the method comprising:

an electrode-cleaning step in which in a case in which the heating resistor is not driven, a voltage is applied between the second electrode and the third electrode so that the second electrode has a same polarity as the polarity of the predetermined component, and the third electrode has a polarity opposite to the polarity of the predetermined component.

10. The cleaning method according to claim 9, further comprising a step of forcibly discharging the liquid in the liquid chamber and then providing a new liquid flow into the liquid chamber, after the electrode-cleaning step.

11. The cleaning method according to claim 9, further comprising a step of applying a voltage between the second electrode and the third electrode so that the second electrode has a polarity opposite to the polarity of the predetermined component, and the third electrode has the same polarity as the polarity of the predetermined component, in a case where the heating resistor is not driven.

12. The cleaning method according to claim 9, wherein the voltage applied between the second electrode and the third electrode in the electrode-cleaning step is set to a value higher than the voltage applied between the first electrode and the second electrode in a case where the heating resistor is driven.

13. The cleaning method according to claim 9, wherein the electrode-cleaning step is performed in a case in which the number of times that the heating resistor is driven is a predetermined number or more.

14. The cleaning method according to claim 9, wherein the electrode-cleaning step is performed in a case in which a value of an electric current in the liquid chamber is a predetermined value or less.

15. A liquid ejecting apparatus that ejects liquid in accordance with ejection data by using a liquid ejecting head comprising, in a liquid chamber including the liquid:

a heating resistor configured to generate thermal energy for ejecting the liquid;

a first electrode placed so as to cover the heating resistor;

a second electrode placed at a position different from a position at which the first electrode is placed; and a third electrode placed at a position different from the position at which the first electrode is placed and the position at which the second electrode is placed, the apparatus comprising:

a first application unit configured to apply, in a case in which the heating resistor is driven, a voltage between the first electrode and the second electrode so that the first electrode has a same polarity as a polarity of a predetermined component included in the liquid, and the second electrode has a polarity opposite to the polarity of the predetermined component; and a second application unit configured to apply, in a case in which the heating resistor is not driven, a voltage between the second electrode and the third electrode so that the second electrode has a same polarity as the polarity of the predetermined component, and the third electrode has a polarity opposite to the polarity of the predetermined component.

16. The liquid ejecting apparatus according to claim 15, further comprising a unit configured to apply, in a case in which the heating resistor is not driven, a voltage between the second electrode and the third electrode so that the second electrode has a polarity opposite to the polarity of the predetermined component, and the third electrode has a same polarity as the polarity of the predetermined component.

17. The liquid ejecting apparatus according to claim 15, wherein the voltage applied by the second application unit between the second electrode and the third electrode is higher than the voltage applied by the first application unit between the first electrode and the second electrode.

18. The liquid ejecting apparatus according to claim 15, wherein the predetermined component is an ion or colloidal particle of a coloring material included in the liquid, having an electric charge on a surface of the colloidal particle.

19. The liquid ejecting apparatus according to claim 15, wherein the second application unit applies the voltage between the second electrode and the third electrode in a case in which the number of times that the heating resistor is driven is a predetermined number or more.

20. The liquid ejecting apparatus according to claim 15, wherein the second application unit applies the voltage between the second electrode and the third electrode in a case in which a value of an electric current in the liquid chamber is a predetermined value or less.

* * * * *